US008891096B2

(12) United States Patent
Tomono

(10) Patent No.: US 8,891,096 B2
(45) Date of Patent: Nov. 18, 2014

(54) IMAGE PROCESSING APPARATUS AND NON-TRANSITORY STORAGE MEDIUM STORING PROGRAM TO BE EXECUTED BY THE SAME

(71) Applicant: Keitaro Tomono, Nagoya (JP)

(72) Inventor: Keitaro Tomono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 142 days.

(21) Appl. No.: 13/726,945

(22) Filed: Dec. 26, 2012

(65) Prior Publication Data

US 2013/0163023 A1 Jun. 27, 2013

(30) Foreign Application Priority Data

Dec. 26, 2011 (JP) ................................. 2011-284365

(51) Int. Cl.
*H04N 1/00* (2006.01)
(52) U.S. Cl.
CPC ....... *H04N 1/00392* (2013.01); *H04N 1/00411* (2013.01); *H04N 1/00517* (2013.01); *H04N 1/00474* (2013.01); *H04N 2201/0094* (2013.01); *H04N 1/00408* (2013.01)
USPC .............. 358/1.13; 358/1.15; 399/80; 399/81
(58) Field of Classification Search
CPC ........................ H04N 1/00517; H04N 1/00411
USPC .............. 358/1.13, 1.14, 1.15; 715/700, 788; 399/80, 81
See application file for complete search history.

(56) References Cited

U.S. PATENT DOCUMENTS

| 5,726,883 A | 3/1998 | Levine et al. |
| 7,242,498 B2 | 7/2007 | Fujiwara |

(Continued)

FOREIGN PATENT DOCUMENTS

| JP | H09-37001 A | 2/1997 |
| JP | H09-179801 A | 7/1997 |

(Continued)

OTHER PUBLICATIONS

Notification of Reason for Refusal dated Oct. 15, 2013 from related Japanese Application No. 2013-018121 together with English translation.

(Continued)

*Primary Examiner* — Dennis Dicker
(74) *Attorney, Agent, or Firm* — Scully, Scott, Murphy & Presser, PC

(57) ABSTRACT

An image processing apparatus includes: an image processing device; a display portion capable of detecting a touch of an input object; a storage storing preset-setting groups; a preset-setting-group-selection-screen display controller displays icons corresponding to the preset-setting groups; and an image-processing-device controller for controlling the image processing device. When at least two icons are displayed on the display portion such that one icon is displayed in a selected state manner, and a specific icon is displayed in a non-selected state manner, and when the specific icon is touched, the preset-setting-group-selection-screen display controller moves the specific icon located on a second area to a first area and moves the one icon located on the first area to the second area in a direction in which the specific icon is moved, and displays the specific icon in the selected state manner and display the one icon in the non-selected state manner.

13 Claims, 13 Drawing Sheets

(56) References Cited

U.S. PATENT DOCUMENTS

| | | | |
|---|---|---|---|
| 7,929,157 | B2 | 4/2011 | Nakagiri |
| 7,991,317 | B2 | 8/2011 | Kato et al. |
| 8,405,856 | B2 | 3/2013 | Do et al. |
| 8,717,616 | B2 * | 5/2014 | Okada .......................... 358/1.18 |
| 2003/0066027 | A1 | 4/2003 | Nakagiri |
| 2003/0107758 | A1 | 6/2003 | Fujiwara |
| 2003/0160774 | A1 | 8/2003 | Minagawa |
| 2004/0205169 | A1 | 10/2004 | Machida |
| 2006/0136992 | A1 | 6/2006 | Shigeeda |
| 2007/0247641 | A1 * | 10/2007 | Okuma et al. .................. 358/1.1 |
| 2008/0199199 | A1 | 8/2008 | Kato et al. |
| 2009/0046057 | A1 | 2/2009 | Umezawa |
| 2009/0316180 | A1 | 12/2009 | Nakagawa |
| 2010/0211963 | A1 | 8/2010 | Suwabe |
| 2010/0212023 | A1 | 8/2010 | Asahara |
| 2011/0007351 | A1 | 1/2011 | Kurumasa et al. |
| 2011/0194144 | A1 | 8/2011 | Shigenobu |
| 2011/0199629 | A1 | 8/2011 | Sensu et al. |
| 2011/0317192 | A1 * | 12/2011 | Fukuoka et al. ............. 358/1.13 |
| 2013/0100473 | A1 * | 4/2013 | Ono ............................. 358/1.13 |
| 2013/0139102 | A1 * | 5/2013 | Miura et al. .................. 715/788 |

FOREIGN PATENT DOCUMENTS

| | | | |
|---|---|---|---|
| JP | 11-215283 A | 8/1999 |
| JP | 2003-91384 A | 3/2003 |
| JP | 2003-202973 A | 7/2003 |
| JP | 2005-7579 A | 1/2005 |
| JP | 2007-148909 A | 6/2007 |
| JP | 2007-300289 A | 11/2007 |
| JP | 2008-176601 A | 7/2008 |
| JP | 2008-210383 A | 9/2008 |
| JP | 2009-70365 A | 4/2009 |
| JP | 2009-98966 A | 5/2009 |
| JP | 2010-3167 A | 1/2010 |
| JP | 2011-164726 A | 8/2011 |
| JP | 2011164835 A | 8/2011 |
| JP | 2011232971 A | 11/2011 |

OTHER PUBLICATIONS

Japanese Official Action dated May 7, 2013 received from the Japanese Patent Office in related application JP 2013-018121 corresponding to U.S. Appl. No. 13/726,945, together with an English language translation.

U.S. Appl. No. 13/617,302, filed on Sep. 14, 2012, Entitled: "Image Processor and Non-Transitory Storage Medium Storing Program", First Named Inventor: Takatoshi Ono.

Notice of Allowance dated Jan. 16, 2014 from related U.S. Appl. No. 13/617,302.

* cited by examiner

IMAGE PROCESSING APPARATUS AND NON-TRANSITORY STORAGE MEDIUM STORING PROGRAM TO BE EXECUTED BY THE SAME

CROSS REFERENCE TO RELATED APPLICATION

The present application claims priority from Japanese Patent Application No. 2011-284365, which was filed on Dec. 26, 2011, the disclosure of which is herein incorporated by reference in its entirety.

BACKGROUND OF THE INVENTION

1. Field of the Invention

The present invention relates to an image processing apparatus and a non-transitory storage medium storing a program to be executed by the image processing apparatus.

2. Description of the Related Art

There has been known a multifunction peripheral (MFP) provided with a touch panel display and having various functions such as a printing function, a scanning function, a copying function, and a facsimile function. When using the function in such an MFP, a user can operate the touch panel display to change various parameters.

There has been also known a technique for displaying a plurality of setting items in the form of icons on a first area within a display screen. In this technique, when any of the icons on the first area is selected, the icon selected is displayed on a second area that is different from the first area.

SUMMARY OF THE INVENTION

However, the above-described technique has difficulty in effectively utilizing a display screen of an image processing apparatus. This invention has been developed to provide a technique capable of utilizing a display screen effectively.

The present invention provides an image processing apparatus, comprising: an image processing device comprising at least one of: an image reading device configured to read an image from a document; and an image forming device configured to form an image on a recording medium; a display portion configured to display thereon at least one image and detect that a display screen of the display portion is touched by an input object; a preset-setting-group storage device configured to store a plurality of preset-setting groups each constituted by a set of a plurality of settings relating to an image processing to be executed by the image processing device, the set of the plurality of settings being combined together in advance; a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, when at least two icons of the plurality of icons are displayed on the display portion such that one icon of the at least two icons is displayed in the selected state manner, and a specific icon of the at least two icons which is different from the one icon is displayed in the non-selected state manner, and when the display portion outputs a signal corresponding to a touch of the input object on a position corresponding to the specific icon within the display portion, the preset-setting-group-selection-screen display controller moves the specific icon located on the second area to the first area and moves the one icon located on the first area to the second area in a direction in which the specific icon is moved, and the preset-setting-group-selection-screen display controller controls the display portion to display the specific icon having been moved to the first area in the selected state manner as a new icon and display the one icon having been moved to the second area in the non-selected state manner.

The present invention also provides an image processing apparatus, comprising: an image processing device comprising at least one of: an image reading device configured to read an image from a document; and an image forming device configured to form an image on a recording medium; a display portion configured to display thereon at least one image and detect that a display screen of the display portion is touched by an input object; a preset-setting-group storage device configured to store a plurality of preset-setting groups each constituted by a set of a plurality of settings relating to an image processing to be executed by the image processing device, the set of the plurality of settings being combined together in advance; a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, in a state in which at least two icons of the plurality of icons are displayed on the display portion, the display screen has a two-icon display area that is an area where the at least two icons are displayed, and when the display portion outputs a signal corresponding to a movement of a touch position of the input object on the two-icon display area in one direction, the preset-setting-group-selection-screen display controller scrolls the at least two icons in the one direction on the basis of the movement of the touch position, and, when the display portion ceases detecting the touch position, the preset-setting-group-selection-screen display controller controls the display portion to display (i) one of the at least two icons which is to be displayed nearest to the first area, on the first area as the new icon in the selected state manner and (ii) at least one icon of the at least two icons other than the new icon in the non-selected state manner.

The present invention also provides a non-transitory storage medium storing a program to be executed by a computer of an image processing apparatus comprising an image processing device comprising at least one of: an image reading device configured to read an image from a document; and an image forming device configured to form an image on a recording medium, the program being designed to cause the computer to function as: a display portion configured to display thereon at least one image and detect that a display screen of the display portion is touched by an input object; a preset-setting-group storage device configured to store a plurality of preset-setting groups each constituted by a set of a plurality of settings relating to an image processing to be executed by the image processing device, the set of the plurality of settings being combined together in advance; a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, when at least two icons of the plurality of icons are displayed on the display portion such that one icon of the at least two icons is displayed in the selected state manner, and a specific icon of the at least two icons which is different from the one icon is displayed in the non-selected state manner, and when the display portion outputs a signal corresponding to a touch of the input object on a position corresponding to the specific icon within the display portion, the preset-setting-group-selection-screen display controller moves the specific icon located on the second area to the first area and moves the one icon located on the first area to the second area in a direction in which the specific icon is moved, and the preset-setting-group-selection-screen display controller controls the display portion to display the specific icon having been moved to the first area in the selected state manner as a new icon and display the one icon having been moved to the second area in the non-selected state manner.

The present invention also provides a non-transitory storage medium storing a program to be executed by a computer of an image processing apparatus comprising an image processing device comprising at least one of: an image reading device configured to read an image from a document; and an image forming device configured to form an image on a recording medium, the program being designed to cause the computer to function as: a display portion configured to display thereon at least one image and detect that a display screen of the display portion is touched by an input object; a preset-setting-group storage device configured to store a plurality of preset-setting groups each constituted by a set of a plurality of settings relating to an image processing to be executed by the image processing device, the set of the plurality of settings being combined together in advance; a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, in a state in which at least two icons of the plurality of icons are displayed on the display portion, the display screen has a two-icon display area that is an area where the at least two icons are displayed, and when the display portion outputs a signal corresponding to a movement of a touch position of the input object on the two-icon display area in one direction, the preset-setting-group-selection-screen display controller scrolls the at least two icons in the one direction on the basis of the movement of the touch position, and, when the display portion ceases detecting the touch position, the preset-setting-group-selection-screen display controller controls the display portion to display (i) one of the at least two icons which is to be displayed nearest to the first area, on the first area as the new icon in the selected state manner and (ii) at least one icon of the at least two icons other than the new icon in the non-selected state manner.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Hereinafter, there will be described one embodiment of the present invention by reference to the drawings.

<Structure of MFP>

Figure 1:
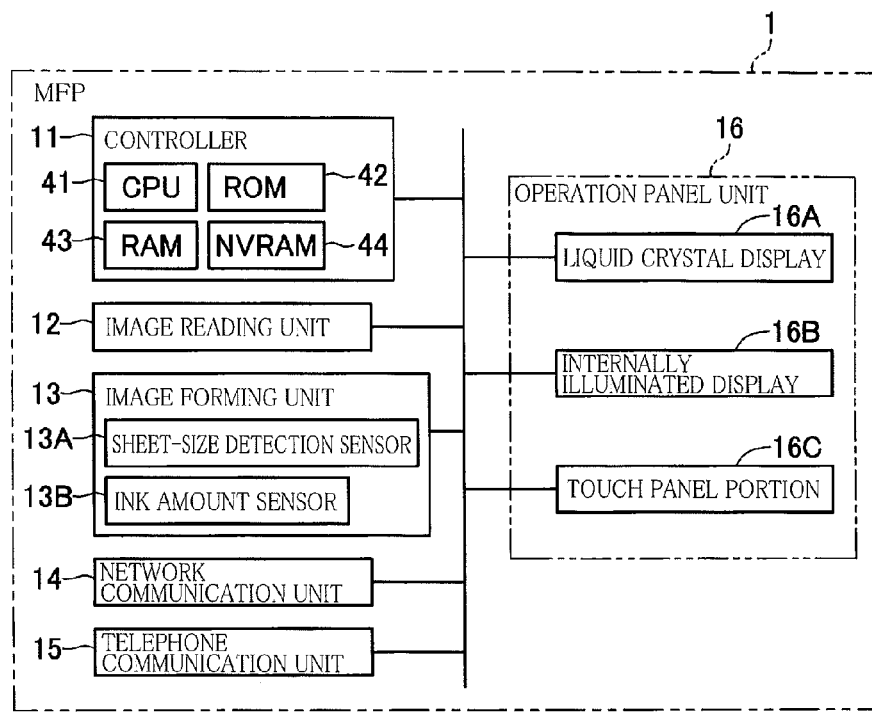
FIG. 1 is a block diagram showing an internal structure of an MFP.

An MFP 1 is an apparatus having various functions such as a printing function, a scanning function, a copying function, a facsimile function, and a telephone function. As shown in FIG. 1, the MFP 1 includes a controller 11, an image reading unit 12, an image forming unit 13, a network communication unit 14, a telephone communication unit 15, and an operation panel unit 16.

The controller 11 is constituted mainly by a well-known microcomputer including a CPU 41, a ROM 42, a RAM 43, and an NVRAM 44. The CPU 41 executes processings which will be described below according to programs stored in the ROM 42 to control components of the MFP 1.

The ROM 42 stores a basic function program for the CPU 41 to control basic operations of the MFP 1. The ROM 42 stores various icon images to be displayed on a liquid crystal display 16A. The ROM 42 stores names of the respective icons (i.e., icon names). Each icon name as a particular image is a character string to be displayed near the corresponding icon.

Figure 13:
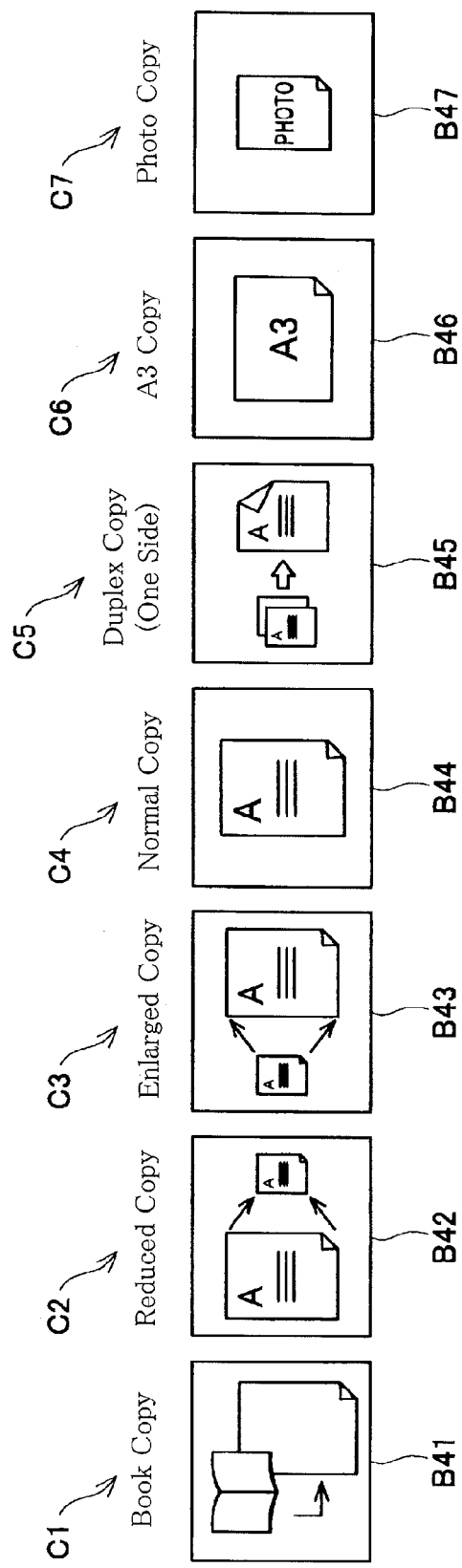
FIG. 13 is a view for explaining one example of preset-setting-group icons.

The NVRAM 44 stores a plurality of preset-setting groups. Each of the preset-setting groups is constituted by a set of a plurality of settings relating to an image processing to be executed by the MFP 1, and the set of the plurality of settings are combined together in advance. FIG. 13 shows one example of preset-setting-group icons B41-B47 respectively corresponding to the preset-setting groups. FIG. 13 also shows one example of icon names C1-C7 respectively corresponding to the preset-setting-group icons B41-B47.

The preset-setting-group icon B41 corresponds to a preset setting group relating to "Book Copy". The preset-setting-group icon B42 corresponds to a preset setting group relating to "Reduced Copy". The preset-setting-group icon B43 corresponds to a preset setting group relating to "Enlarged Copy". The preset-setting-group icon B44 corresponds to a preset setting group relating to "Normal Copy". The preset-setting-group icon B45 corresponds to a preset setting group relating to "Duplex Copy". The preset-setting-group icon B46 corresponds to a preset setting group relating to "A3 Copy". The preset-setting-group icon B47 corresponds to a preset setting group relating to "Photo Copy". When any of the preset-setting-group icons B41-B47 is selected, the MFP 1 reads set values of the preset-setting group corresponding to the selected preset-setting-group icon, and stores or writes them into the RAM 43, and the CPU 41 controls the image processing according to the stored set values.

As shown in FIG. 13, the preset-setting-group icons B41-B47 have a relationship in which these icons are cyclically arranged in a row. Sequential icon numbers "1"-"7" are respectively assigned to the preset-setting-group icons B41-B47. The preset-setting-group icon B41 is a first icon having the icon number "1". The preset-setting-group icon B47 is the last icon having the icon number "7". To each of the preset-setting-group icons B41-B47 is assigned an apparatus state or states of the MFP 1 which cannot cause the icon to be changed to the selected state. For example, the preset-setting-group icon B46 for the setting group of the "A3 Copy" cannot be changed to the selected state when no A3 sheets are set in the MFP 1. Likewise, the preset-setting-group icon B47 for the setting group of the "Photo Copy" cannot be changed to the selected state when no ink is stored in any one of ink cartridges set in the MFP 1 for respective colors. The ROM 42 stores such relationships between the preset-setting-group icons and the apparatus states of the MFP 1.

The NVRAM 44 stores various parameters. Examples of the parameters include a first moving speed and a second moving speed. The first moving speed is used for the CPU 41 to determine whether an operation performed by a user on a touch panel portion 16C is a flick operation or a drag operation. The second moving speed is used for the CPU 41 to determine a scroll distance. These parameters may be stored in advance by the user.

The RAM 43 is a transitory memory that is a storage area for storing various data created when the CPU 41 executes various processings according to the basic function program. One example of the data stored in the RAM 43 is the preset-setting-group icon being in the selected state. The preset-setting-group icon being in the selected state is one of the preset-setting-group icons which is in the selected state.

The image reading unit 12 includes an image sensor and an automatic document feeder (ADF). The image reading unit 12 uses the image sensor to read an image of a document conveyed by the ADF or placed on a platen glass of a flatbed to create image data representative of the image.

The image forming unit 13 is constituted by an image forming device of an ink-jet type or an electronic photographic type. The image forming unit 13 records an image on a recording medium in the form of a recording sheet. The image forming unit 13 includes a sheet-size detection sensor 13A and an ink amount sensor 13B. The sheet-size detection sensor 13A detects a size of the recording medium set in the MFP 1, e.g., the A4 size. The ink amount sensor 13B detects a remaining amount of the ink for each ink cartridge mounted in the MFP 1.

The network communication unit 14 includes a network interface card (NIS). The telephone communication unit 15 is constituted by a modem and other communication components and used to perform communication via a telephone line, not shown.

Figure 2:
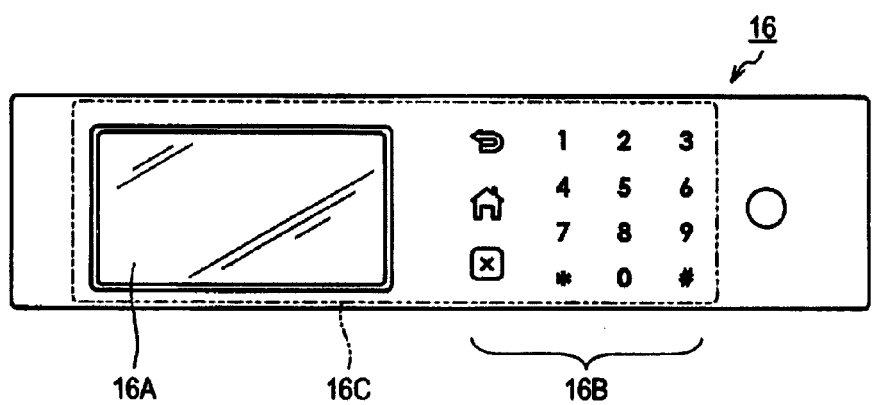
FIG. 2 is a view for explaining an operation panel unit.
Figure 3:
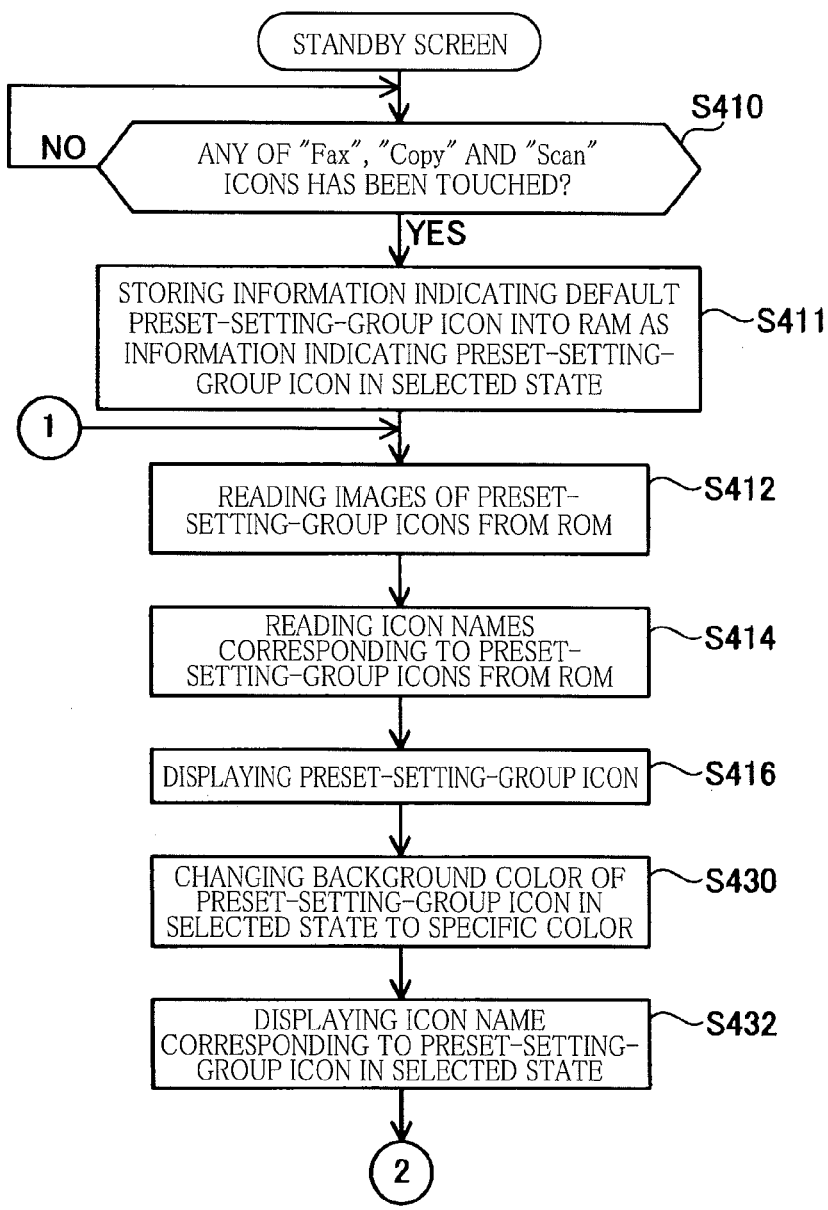
FIG. 3 is a flow chart showing a setting change processing.

As shown in FIG. 2, the operation panel unit 16 includes the liquid crystal display 16A, an internally illuminated display 16B, and the touch panel portion 16C. The liquid crystal display 16A includes an LCD module capable of displaying images in full color. Contents displayed on the liquid crystal display 16A include: images such as various icons and user operation buttons; and texts representing various information. These contents are dynamically displayed depending upon the status of the MFP 1 and the operation of the user.

The internally illuminated display 16B displays thereon images representative of a numeric keypad and some user operation buttons. This internally illuminated display 16B has a front panel which is provided with light transmitting portions associated in position with the respective images. Light emitting elements are provided on the back of the respective light transmitting portions, and when these light emitting elements emit lights, the images are lit in their respective predetermined colors. It is noted that a display surface of the liquid crystal display 16A is flush with that of the internally illuminated display 16B.

The touch panel portion 16C is a transparent film-like input device that can detect a touch operation or action of an input object such as a finger and a stylus. This touch panel portion 16C is of a well-known type such as an electrostatic capacitance type and superposed on the display surfaces of the liquid crystal display 16A and the internally illuminated display 16B. In the present embodiment, when the touch operation is detected by the touch panel portion 16C, an output signal indicative of a touch position or positions is supplied from the touch panel portion 16C to the controller 11. The controller 11 based on the output signal determines a type of the detected touch operation. Types of the touch operation include: a slide operation such as the drag operation and the flick operation; a tapping operation such as a single tapping operation and a double tapping operation; and a pinching operation. The controller 11 also determines whether or not the location of the touch operation is within an area overlaying the display surface of the liquid crystal display 16A and whether or not the location overlaps any of the images displayed on the internally illuminated display 16B. The controller 11 executes a processing corresponding to the type and location of the touch operation.

<Examples of Displayed Screen>

Figure 9:
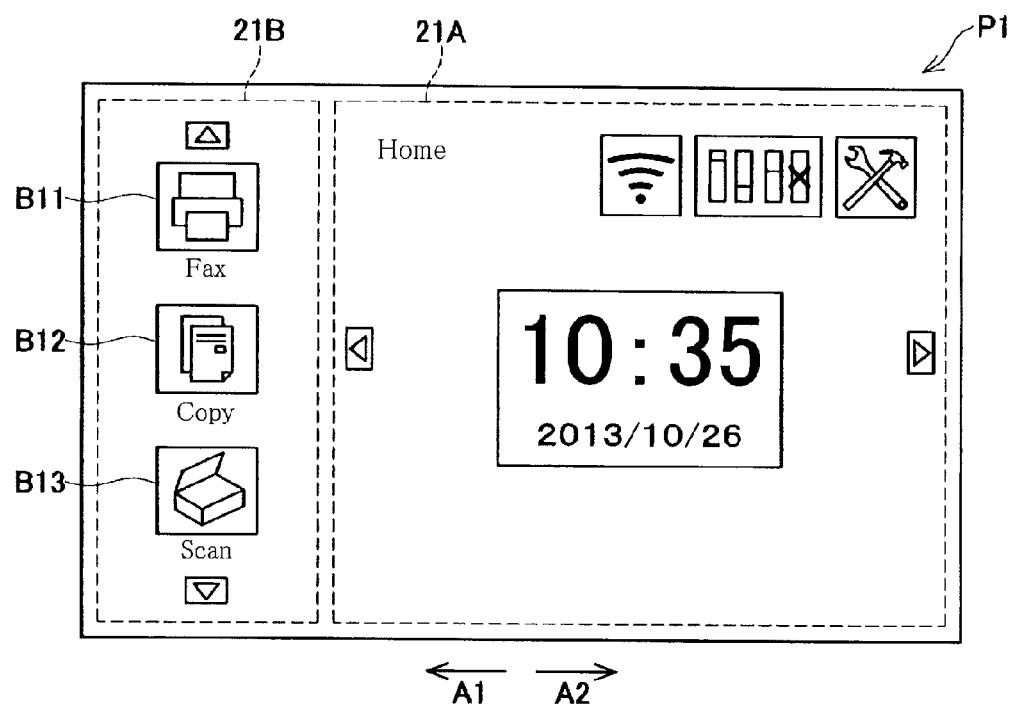
FIG. 9 is a view for explaining one example of a screen displayed on a liquid crystal display.

FIGS. 9-12 show examples of screens displayed on the liquid crystal display 16A. FIG. 9 shows one example of a "Home" screen P1. The "Home" screen P1 is displayed on the liquid crystal display 16A when the MFP 1 is in a standby state. The "Home" screen P1 has a main area 21A and a left area 21B. The left area 21B contains a "Fax" icon B11, a "Copy" icon B12, and a "Scan" icon B13. These icons respectively correspond to the functions of the MFP 1.

When the touch operation is performed by the user on any of the "Fax" icon B11, the "Copy" icon B12, and the "Scan" icon B13, the controller 11 controls the liquid crystal display 16A to display thereon a screen that represents a top page corresponding to the selected function.

Figure 10:
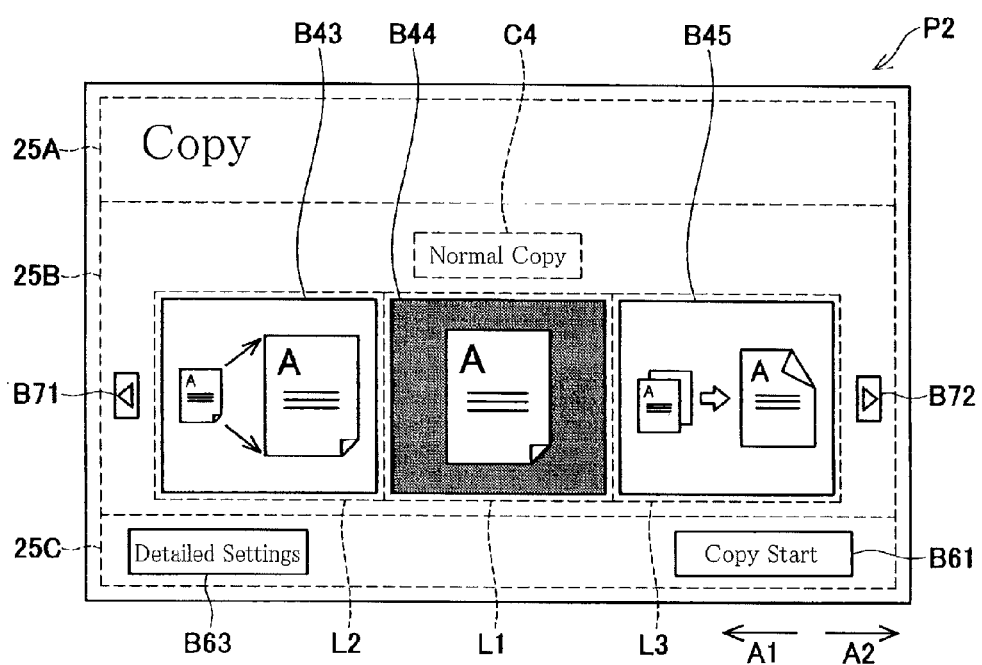
FIG. 10 is a view for explaining another example of the screen displayed on the liquid crystal display.

FIG. 10 shows one example of a preset-setting-group selection screen P2. The preset-setting-group selection screen P2 is displayed on the liquid crystal display 16A when the "Copy" icon B12 on the "Home" screen P1 is touched. In this preset-setting-group selection screen P2, a display region of the liquid crystal display 16A is divided into three areas 25A, 25B, and 25C. Various information is displayed on the upper area 25A. Displayed on the middle area 25B are the preset-setting-group icons, a left scroll button B71, and a right scroll button B72. Displayed on the lower area 25C are a "Copy Start" button B61 and a "Detailed Settings" button B63.

The area 25B includes a central area L1 as one example of a first area, and a left neighborhood (nearby area) L2 and a right neighborhood (nearby area) L3 each as one example of a second area. The left neighborhood L2 is located on a left side of the central area L1, and the right neighborhood L3 is located on a right side of the central area L1. Displayed on the central area L1 is the preset-setting-group icon being in the selected state. Displayed on each of the right neighborhood L3 and the left neighborhood L2 is a preset-setting-group icon being in a non-selected state. In the example in FIG. 10, the preset-setting-group icon B44 is displayed on the central area L1. On an upper side of the preset-setting-group icon B44 is displayed the icon name C4 "Normal Copy" stored in the ROM 42. The preset-setting-group icon B43 is displayed on the left neighborhood L2, and the preset-setting-group icon B45 is displayed on the right neighborhood L3.

A background color of the preset-setting-group icon displayed on each of the right neighborhood L3 and the left neighborhood L2 is a normal color (black in the present embodiment). On the other hand, a background color of the preset-setting-group icon displayed on the central area L1 is a specific color (blue in the present embodiment) that differs from the normal color (black). Also, the icon name C4 is displayed above the preset-setting-group icon B44 displayed on the central area L1. As a result, a focus indicating the selected state is applied to the preset-setting-group icon B44 displayed on the central area L1.

Figure 11:
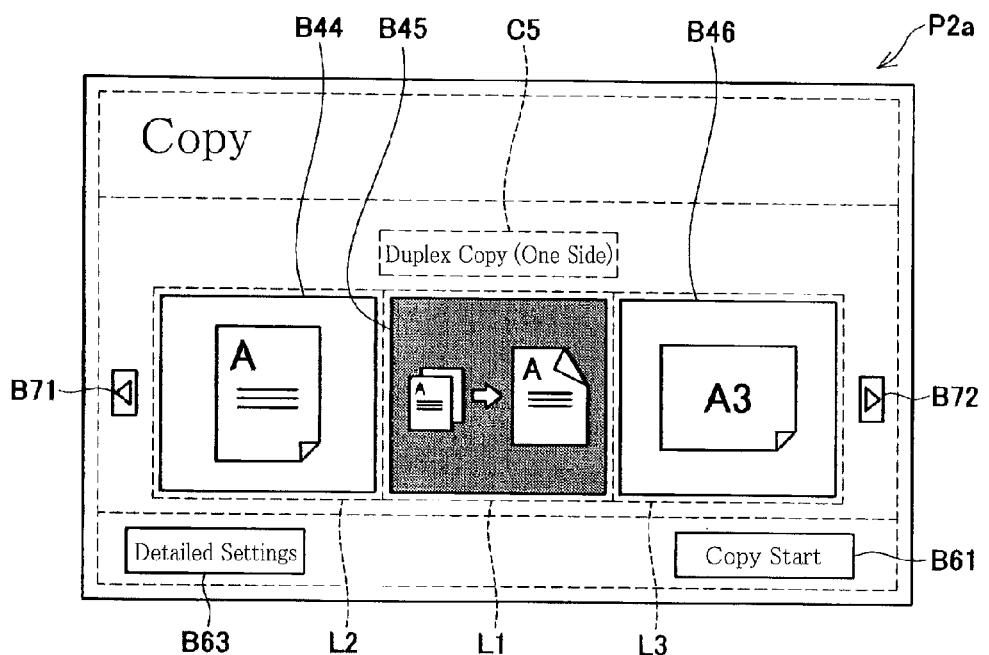
FIG. 11 is a view for explaining another example of the screen displayed on the liquid crystal display.

FIG. 11 shows a preset-setting-group selection screen P2a. The preset-setting-group selection screen P2a is one example of a screen displayed upon scrolling on the area 25B of the preset-setting-group selection screen P2 in FIG. 10. On the preset-setting-group selection screen P2a in FIG. 11, the preset-setting-group icon B45 is displayed on the central area L1. The icon name C5 "Duplex Copy (One Side)" is displayed above the preset-setting-group icon B45. The preset-setting-group icon B44 is displayed on the left neighborhood L2. The preset-setting-group icon B46 is displayed on the right neighborhood L3.

Figure 12:
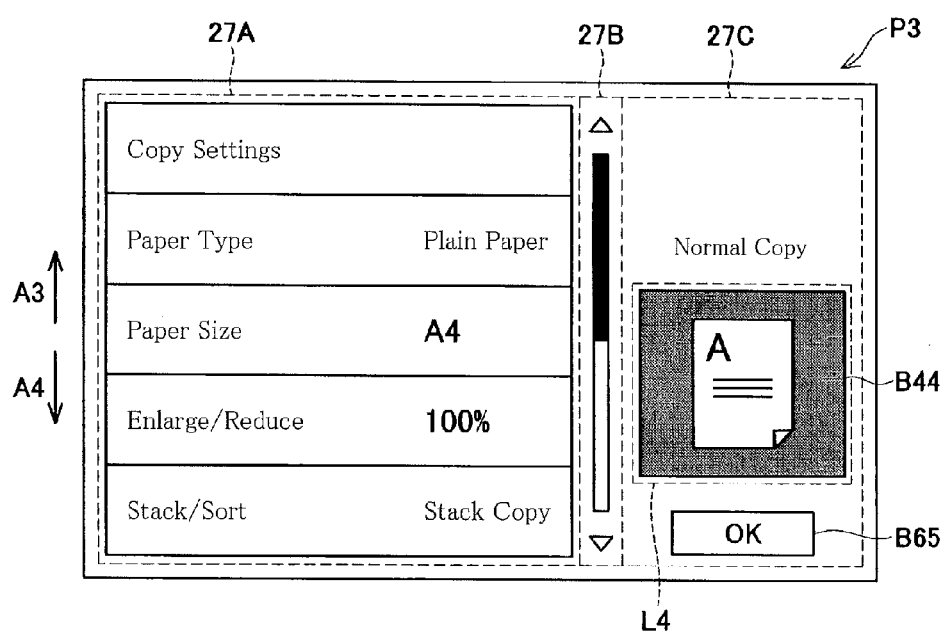
FIG. 12 is a view for explaining another example of the screen displayed on the liquid crystal display.

FIG. 12 shows one example of a "Detailed Settings" screen P3. The "Detailed Settings" screen P3 is displayed on the liquid crystal display 16A when the user touches the "Detailed Settings" button B63 displayed on the preset-setting-group selection screen P2 in FIG. 10 or the preset-setting-group selection screen P2a in FIG. 11. The "Detailed Settings" screen P3 has three areas 27A, 27B, and 27C. Displayed on the right area 27C are the preset-setting-group icon being in the selected state and an "OK" button B65. A scrollbar is displayed on the central area 27B. Displayed on the left area 27A are a plurality of setting items and their respective set values. The setting items displayed on this area 27A correspond to the preset-setting-group icon being in the selected state and displayed on the area 27C. The area 27A is scrolled in an up and down direction (i.e., directions indicated by arrows A3 and A4 in FIG. 12) in response to the operation of the user. This scrolling allows the user to view setting items outside the display region of the liquid crystal display 16A.

In the example in FIG. 12, the preset-setting-group icon B44 being in the selected state and its icon name "Normal Copy" are displayed on the area 27C. Also, the plurality of setting items such as "Paper Type" relating to the processing (i.e., the "Normal Copy") corresponding to the preset-setting-group icon B44 being in the selected state are read from the NVRAM 44 and displayed on the area 27A.

<Setting Change Processing>

There will be next explained, with reference to FIGS. 3-8, processings executed by the controller 11 to accomplish a setting change processing accompanied by screen transitions.

At S410, the controller 11 displays the "Home" screen P1 on the liquid crystal display 16A. The controller 11 then determines whether the user has touched any one of the "Fax" icon B11, the "Copy" icon B12, and the "Scan" icon B13. Here is explained one specific example of how to execute the determination with reference to the "Home" screen P1 in FIG. 9. Each of the "Fax" icon B11, the "Copy" icon B12, and the "Scan" icon B13 has a display area, and coordinates indicating this display area are stored in the ROM 42 in advance. The controller 11 uses the basic function program to obtain the touch position on the touch panel portion 16C. When the touch position thus obtained is located on the coordinates indicating the display area of any of the "Fax" icon B11, the "Copy" icon B12, and the "Scan" icon B13, the controller 11 determines that the user has touched the icon on which the touch position is located. When it is determined that the touch input has not been performed on any icon (S410: NO), the flow repeats S410, and when it is determined that the touch input has been performed on any icon (S410: YES), the flow goes to S411.

Processings to be executed in the case where the user has touched the "Copy" icon B12 displayed on the "Home"

screen P1 in FIG. 9 will be described hereinafter as one example. It is noted that processings to be executed when the "Fax" icon B11 or the "Scan" icon B13 is touched are similar to those to be executed when the "Copy" icon B12 is touched, and an explanation of which is dispensed with.

At S411, the controller 11 stores information indicating a default preset-setting-group icon, e.g., an icon ID, into the RAM 43 as information indicating the preset-setting-group icon being in the selected state. In the example in the present embodiment, it is assumed that the preset-setting-group icon B44 corresponding to the "Normal Copy" is set as the default preset-setting-group icon. The default preset-setting-group icon may be determined by the user or a manufacturer of the MFP 1.

At S412, the controller 11 reads the images of the preset-setting-group icons B41-B47 shown in FIG. 13 from the ROM 42. At S414, the controller 11 reads the icon names C1-C7 corresponding to the respective preset-setting-group icons from the ROM 42 and stores the read icon names into the RAM 43.

At S416, the controller 11 displays the preset-setting-group icon being in the selected state on the central area L1. The controller 11 also displays a preset-setting-group icon having the icon number preceding that of the preset-setting-group icon being in the selected state, on the left neighborhood L2 located on the left side of the central area L1. The controller 11 also displays a preset-setting-group icon having the icon number following that of the preset-setting-group icon being in the selected state, on the right neighborhood L3 located on the right side of the central area L1. As a result, the preset-setting-group icon being in the selected state and displayed on the central area L1 and the preset-setting-group icons displayed on the left neighborhood L2 and the right neighborhood L3 are arranged in a row.

In the example in FIG. 10, the preset-setting-group icon being in the selected state and displayed on the central area L1, i.e., the preset-setting-group icon B44, the preset-setting-group icon B43 displayed on the left neighborhood L2, and the preset-setting-group icon B45 displayed on the right neighborhood L3 are arranged in a row.

At S430, the controller 11 changes the background color of the preset-setting-group icon being in the selected state and displayed on the central area L1 to the specific color (blue). At S432, the controller 11 displays the icon name corresponding to the preset-setting-group icon being in the selected state, above the preset-setting-group icon being in the selected state. Since the background color is the specific color, the user can recognize that the preset-setting-group icon displayed on the central area L1 is in the selected state. Also, since the icon name is displayed above the preset-setting-group icon, the user can recognize that the preset-setting-group icon displayed on the central area L1 is in the selected state. Also, since the background color of each of the preset-setting-group icons displayed on the left neighborhood L2 and the right neighborhood L3 is not the specific color, the user can recognize that these icons are displayed in a non-selected state manner. The non-selected state manner is a display manner which differs from the selected state manner and indicates the non-selected state.

In the example in FIG. 10, the background color of the preset-setting-group icon being in the selected state and displayed on the central area L1, i.e., the background color of the preset-setting-group icon B44 is changed to the specific color (blue). Also, the icon name C4 "Normal Copy" is displayed above the preset-setting-group icon B44.

Figure 4:
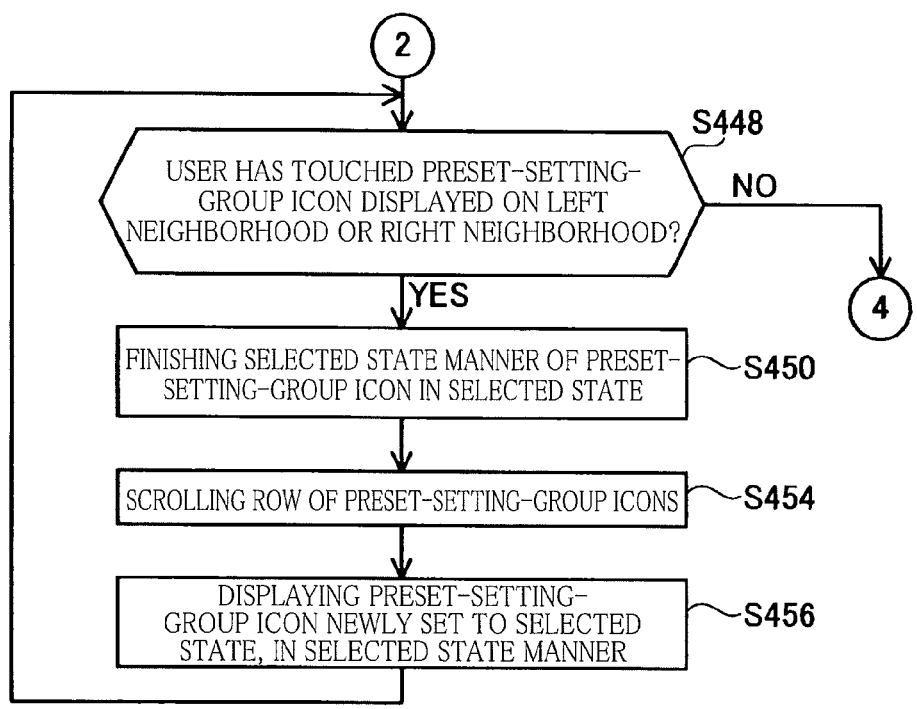
FIG. 4 is another flow chart showing the setting change processing.
Figure 5:
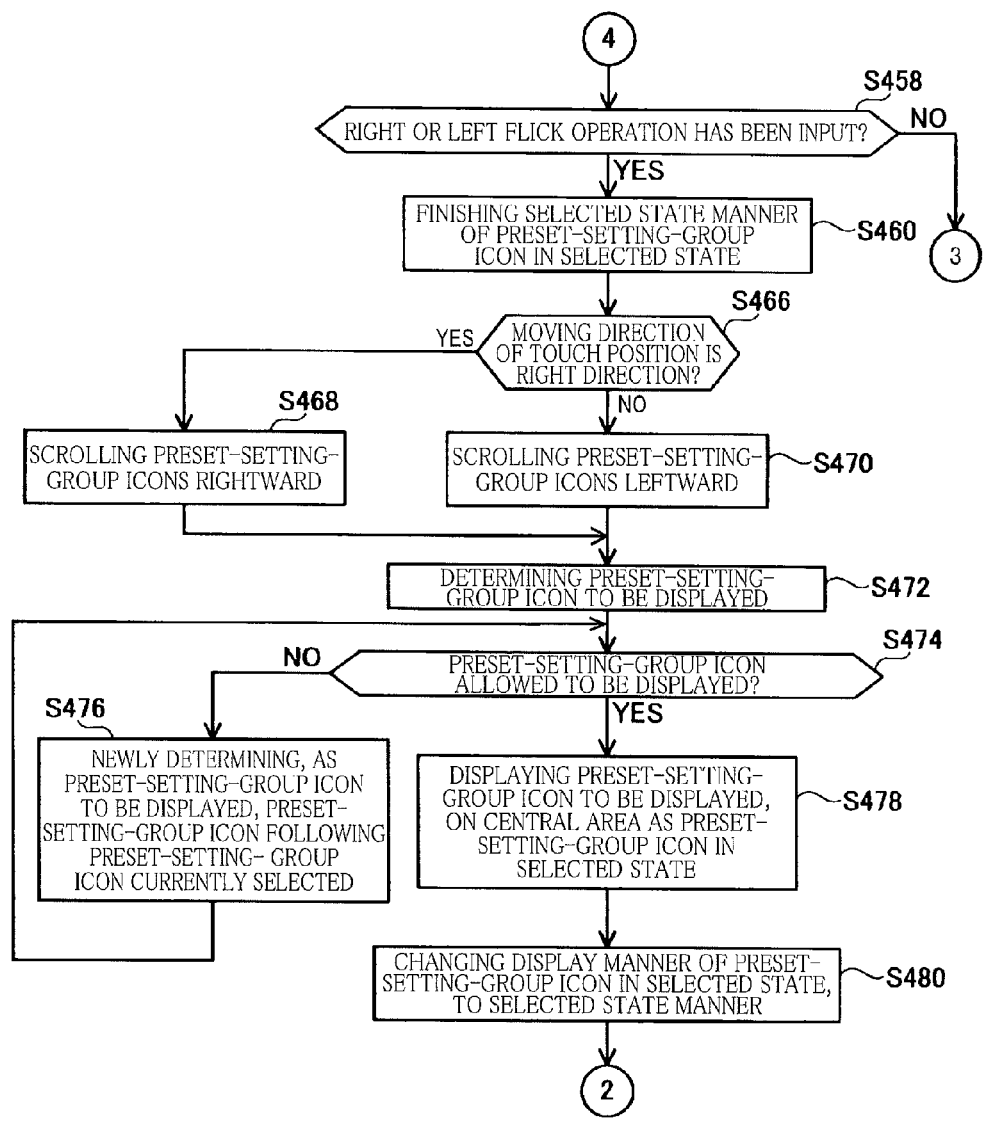
FIG. 5 is another flow chart showing the setting change processing.
Figure 6:
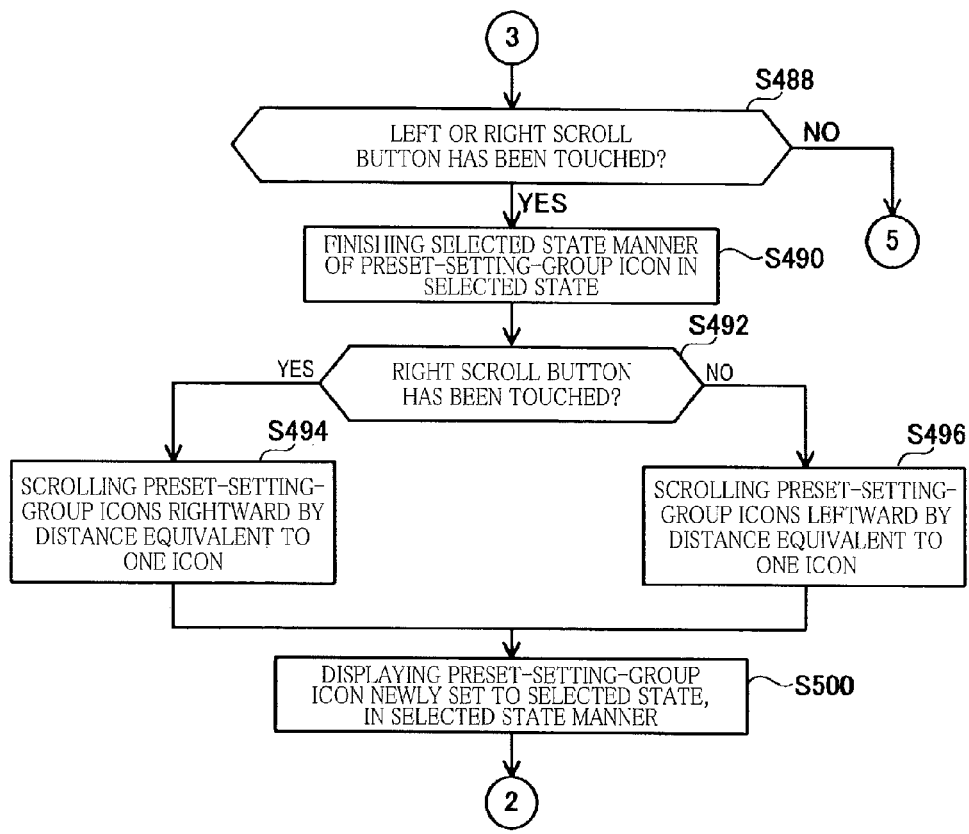
FIG. 6 is another flow chart showing the setting change processing.
Figure 7:
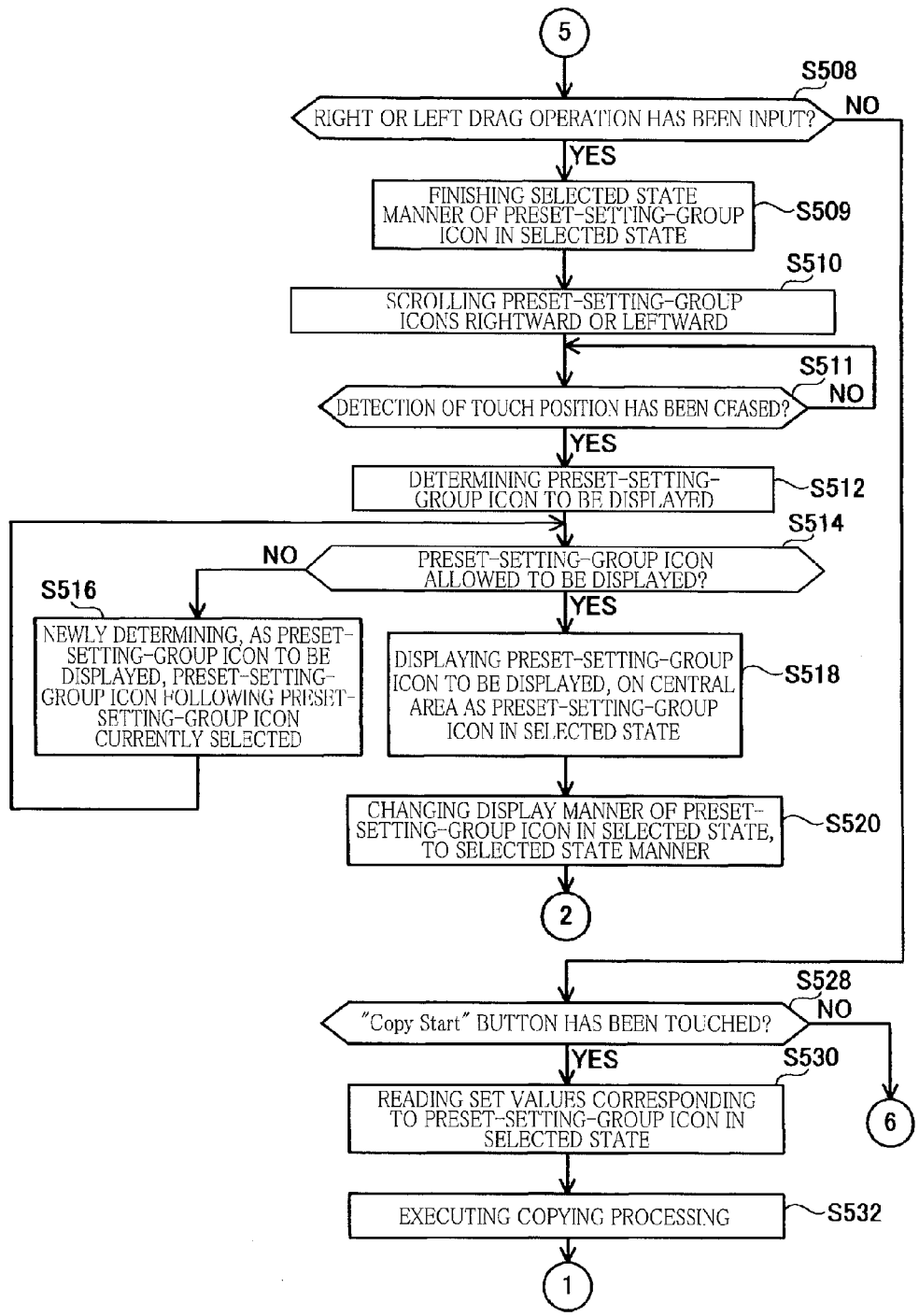
FIG. 7 is another flow chart showing the setting change processing.
Figure 8:
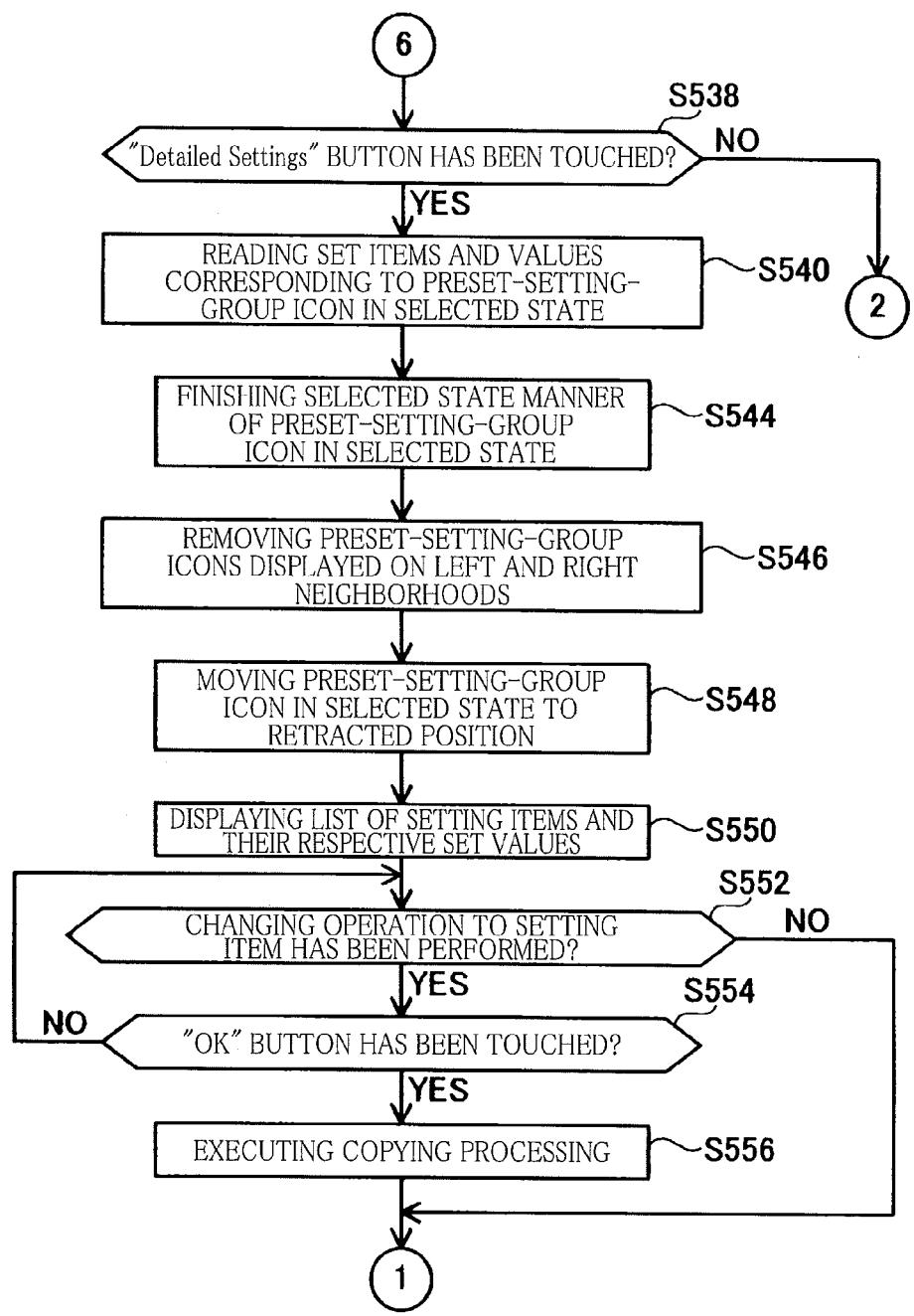
FIG. 8 is another flow chart showing the setting change processing.

At S448 in FIG. 4, the controller 11 determines whether the user has touched the preset-setting-group icon displayed on the left neighborhood L2 or the right neighborhood L3. When it is determined that the preset-setting-group icon displayed on the left neighborhood L2 or the right neighborhood L3 has been touched (S448: YES), the flow goes to S450.

At S450, the controller 11 finishes the selected state manner of the preset-setting-group icon being in the selected state and displayed on the central area L1. Specifically, the controller 11 changes the background color of the preset-setting-group icon being in the selected state and displayed on the central area L1 to the normal color (black). Also, the controller 11 removes the icon name. As a result, the display in the selected state manner is finished for the preset-setting-group icon being in the selected state and displayed on the central area L1.

At S454, the controller 11 moves the touched preset-setting-group icon located on the left neighborhood L2 (or the right neighborhood L3) to the central area L1. At the same time, the controller 11 moves the preset-setting-group icon being in the selected state and displayed on the central area L1, in a direction coinciding with a direction of movement of the touched preset-setting-group icon, to the right neighborhood L3 (or the left neighborhood L2). At the same time, the controller 11 moves another preset-setting-group icon into the left neighborhood L2 (or the right neighborhood L3) from an outside of the liquid crystal display 16A on the frame-by-frame basis such that the preset-setting-group icon gradually appears on the left neighborhood L2 (or the right neighborhood L3). In view of the above, the controller 11 at S454 executes a processing for scrolling the row of the preset-setting-group icons such that the touched preset-setting-group icon is moved to the central area L1.

At S456, the controller 11 stores information indicating the preset-setting-group icon touched at S448, into the RAM 43 as new information indicating the preset-setting-group icon being in the selected state, and the controller 11 displays the preset-setting-group icon touched at S448 in the selected state manner. Specifically, the controller 11 changes the background color to the specific color (blue) and displays the icon name. Also, the controller 11 displays the preset-setting-group icon displayed on the left neighborhood L2 or the right neighborhood L3, in the non-selected state manner. Specifically, the controller 11 keeps the background color in the normal color (black) and does not display the icon name.

There will be next explained one example of the processings at S448-S456, with reference to FIGS. 10 and 11. Specifically, there will be explained processings in the case where the user has touched the preset-setting-group icon B45 displayed on the right neighborhood L3 in FIG. 10. The controller 11 at S450 finishes the selected state manner of the preset-setting-group icon B44 being in the selected state and displayed on the central area L1. The controller 11 moves the touched preset-setting-group icon B45 located on the right neighborhood L3, to the central area L1. At the same time, the controller 11 moves the preset-setting-group icon B44 being in the selected state and displayed on the central area L1, in the direction coinciding with the direction of the movement of the preset-setting-group icon B45, i.e., in the left direction, such that the icon B44 moves to the left neighborhood L2. Also, the controller 11 newly displays the preset-setting-group icon B46 on the right neighborhood L3. In view of the above, the controller 11 at S454 executes a processing for scrolling the row of the preset-setting-group icons such that the touched preset-setting-group icon B45 is moved to the central area L1. The controller 11 then stores information indicating the selected preset-setting-group icon B45, into the RAM 43 as the information indicating the preset-setting-group icon being in the selected state. The controller 11 at S456 displays the preset-setting-group icon B45 in the selected state manner. As a result, the display screen in FIG. 10 is switched to the display screen in FIG. 11.

On the other hand, when it is determined at S448 that the preset-setting-group icon displayed on the left neighborhood L2 or the right neighborhood L3 has not been touched (S448: NO), the flow goes to S458 in FIG. 5. At S458, the controller 11 determines whether a right or left flick operation has been input on the area 25B or not. The right or left flick operation is an operation of the user to flick the input object rightward or leftward on the liquid crystal display 16A. Here is explained one example of how to determine whether the user has performed the flick operation or not. The controller 11 uses the touch panel portion 16C to detect the touch position at fixed intervals, e.g., every several tens milliseconds. When the touch panel portion 16C ceases detecting the touch position after the detection of the movement of the touch position, i.e., the slide operation, within the area 25B, the controller 11 calculates a moving speed of the touch position. The moving speed of the touch position is calculated based on a detecting period and a distance between two touch positions most recently detected before the touch panel portion 16C ceases detecting the touch position. When the calculated moving speed of the touch position is greater than the predetermined first moving speed, the controller 11 determines that the user has input the flick operation (S458: YES), and the flow goes to S460.

At S460, the controller 11 finishes the selected state manner of the preset-setting-group icon being in the selected state and displayed on the central area L1. It is noted that the processing at S460 is similar to the processing at S450, and an explanation of which is dispensed with.

At S466, the controller 11 determines whether the direction of the movement of the touch position is the right direction within the area 25B or not. When it is determined that the direction of the movement of the touch position is the right direction (S466: YES), the controller 11 determines that the right flick operation has been received, and the flow goes to S468. At S468, the controller 11 scrolls the preset-setting-group icons displayed on the area 25B in the right direction. In the example in FIG. 10, the row of the preset-setting-group icons is scrolled such that the three preset-setting-group icons B43-B45 being displayed are moved rightward so as to gradually disappear from the liquid crystal display 16A and such that the icons such as the preset-setting-group icons B42, B41 gradually appear from the left side of the liquid crystal display 16A. It is noted that the preset-setting-group icons are started to move at an initial moving speed related to the moving speed of the touch position.

When it is determined at S466 that the direction of the movement of the touch position is the left direction (S466: YES), the controller 11 determines that the left flick operation has been received, and the flow goes to S470. At S470, the controller 11 scrolls the preset-setting-group icons displayed on the area 25B in the left direction. It is noted that the preset-setting-group icons are started to move at the initial moving speed related to the moving speed of the touch position.

At S472, the controller 11 determines a preset-setting-group icon to be displayed, which is a preset-setting-group icon to be displayed newly on the central area L1. Here is explained one example of how to determine the preset-setting-group icon to be displayed. The controller 11 determines the scroll distance. Specifically, the controller 11 uses a velocity decay function to decrease the initial moving speed calculated at S466, with the passage of time. The controller 11 then determines, as the scroll distance, a distance of the movement of the icons at a point in time when the moving speed of the icon becomes lower than the predetermined second moving speed. The controller 11 moves the row of the preset-setting-group icons B41-B47 (shown in FIG. 13) by the scroll distance in a scroll direction in which the icons are scrolled. The controller 11 then extracts preset-setting-group icons whose center lines have not moved past a center line of the central area L1 in the scroll direction, among the moved preset-setting-group icons B41-B47. The controller 11 then determines, as the preset-setting-group icon to be displayed, a preset-setting-group icon that is located nearest to the central area L1 among the extracted preset-setting-group icons.

Figure 14A:
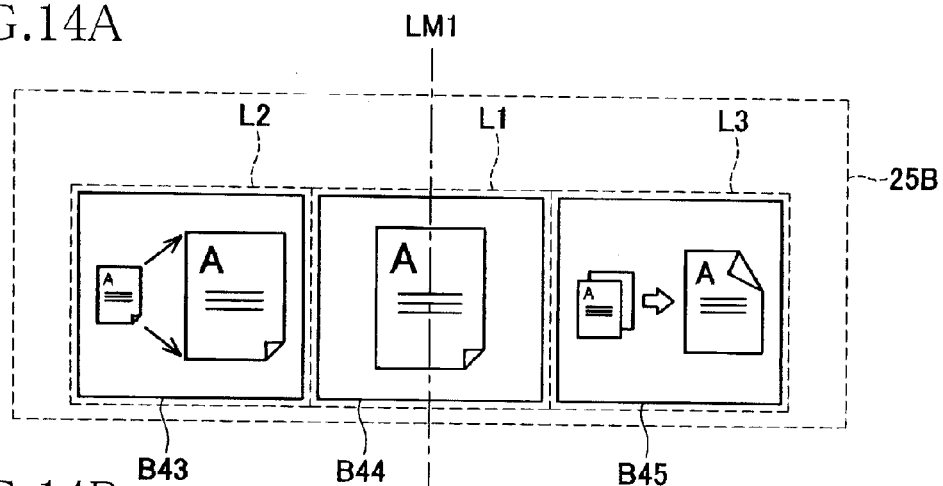
FIGS. 14A-14C are views for explaining how to determine a preset-setting-group icon to be displayed.
Figure 14B:
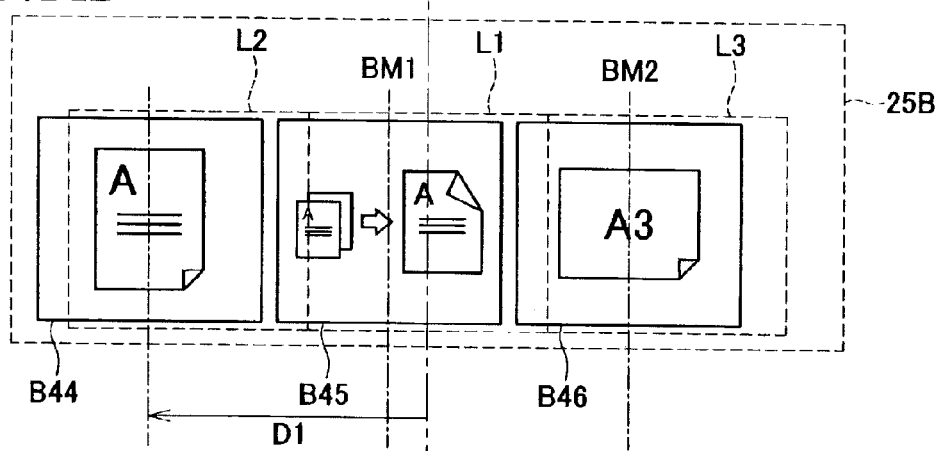

Here is explained, with reference to FIG. 14, one specific example of how to determine the preset-setting-group icon to be displayed. FIG. 14A shows the area 25B before the scrolling, and FIG. 14B shows the area 25B after the scrolling in the left direction. In FIG. 14B, the preset-setting-group icons have been moved leftward by a scroll distance D1 with respect to the preset-setting-group icons in FIG. 14A. In FIG. 14B, since a center line BM1 of the preset-setting-group icon B45 has been moved past a center line LM1 of the central area L1 in the scroll direction, i.e., the left direction, the preset-setting-group icon B45 is not selected as the preset-setting-group icon to be displayed. On the other hand, a center line BM2 of the preset-setting-group icon B46 has not been moved past the center line LM1 of the central area L1 in the scroll direction, i.e., the left direction. In addition, the preset-setting-group icon B46 is located nearest to the central area L1 among the preset-setting-group icons located on a right side of the center line LM1. Thus, the preset-setting-group icon B46 is selected as the preset-setting-group icon to be displayed.

At S474, the controller 11 determines whether or not the preset-setting-group icon determined at S472 as the preset-setting-group icon to be displayed is a preset-setting-group icon allowed to be displayed. Specifically, the controller 11 uses various sensors (e.g., the sheet-size detection sensor 13A and the ink amount sensor 13B) to detect a state of the MFP 1 as an apparatus state of the MFP 1, and then the controller 11 determines whether or not the preset-setting-group icon selected as the preset-setting-group icon to be displayed is allowed to be changed to the selected state in the detected apparatus state.

When it is determined that the preset-setting-group icon determined at S472 is not the preset-setting-group icon allowed to be changed to the selected state (S474: NO), the flow goes to S476 at which the controller 11 newly determines, as the preset-setting-group icon to be displayed, a preset-setting-group icon following, in the scroll number, the preset-setting-group icon currently selected as the preset-setting-group icon to be displayed. It is noted that the preset-setting-group icon following the preset-setting-group icon currently selected as the preset-setting-group icon to be displayed is an icon just after the preset-setting-group icon currently selected as the preset-setting-group icon to be displayed, in the scroll order. Upon completion of S476, the flow returns to S474.

On the other hand, when it is determined that the preset-setting-group icon determined at S472 is the preset-setting-group icon allowed to be changed to the selected state (S474: YES), the flow goes to S478 at which the controller 11 displays the preset-setting-group icon to be displayed, on the central area L1 as the preset-setting-group icon being in the selected state. At S480, the controller 11 changes the display manner of the preset-setting-group icon being in the selected state and displayed on the central area L1, to the selected state manner.

Figure 14C:
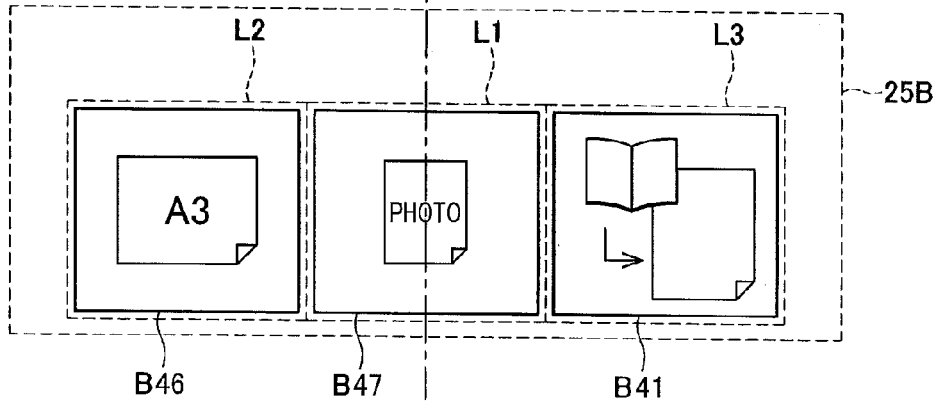

Here is explained, with reference to FIGS. 14B and 14C, one specific example of how to determine whether or not the preset-setting-group icon to be displayed is the preset-setting-group icon allowed to be changed to the selected state. In this example, it is assumed that no A3 sheets are set in the MFP 1, and the preset-setting-group icon B46 whose icon name is the "A3 Copy" is a candidate for the preset-setting-group icon to be displayed after the scrolling. The controller 11 at S474 uses the sheet-size detection sensor 13A to detect that the MFP 1 is in the apparatus state in which no A3 sheets are set in the MFP 1. Since the MFP 1 is in the apparatus state in which no A3 sheets are set in the MFP 1, the controller 11 determines that the preset-setting-group icon B46 whose icon name is the "A3 Copy" as the candidate for the preset-setting-group icon to be displayed is an icon not allowed to be changed to the selected state (S474: NO). The controller 11 at S476 newly selects, as the candidate for the preset-setting-group icon to be displayed, the preset-setting-group icon B47 whose icon name is the "Photo Copy" following the preset-setting-group icon B46 in the scroll number. The preset-setting-group icon B47 is allowed to be changed to the selected state even where the MFP 1 is in the apparatus state in which no A3 sheets are set (S474: YES). Thus, the controller 11 determines the preset-setting-group icon B47 as the preset-setting-group icon to be displayed and displays the preset-setting-group icon B47 on the central area L1 in the selected state manner (at S478 and S480). As a result, the screen displayed on the area 25B is switched from the screen shown in FIG. 14B to the screen shown in FIG. 14C.

On the other hand, when it is determined at S458 that the right or left flick operation has not been input on the area 25B (S458: NO), the flow goes to S488 in FIG. 6. At S488, the controller 11 determines whether or not the user has touched the left scroll button B71 or the right scroll button B72. When it is determined that the user has touched the button B71 or B72 (S488: YES), the flow goes to S490.

At S490, the controller 11 finishes the selected state manner of the preset-setting-group icon being in the selected state and displayed on the central area L1. At S492, the controller 11 determines whether the user has touched the right scroll button B72 or not. When it is determined that the right scroll button B72 has been touched (S492: YES), the flow goes to S494. At S494, the controller 11 scrolls the preset-setting-group icons displayed on the area 25B in the right direction by a distance equivalent to one icon. On the other hand, when it is determined at S492 that the left scroll button B71 has been touched (S492: NO), the flow goes to S496. At S496, the controller 11 scrolls the preset-setting-group icons displayed on the area 25B in the left direction by the distance equivalent to one icon. At S500, the controller 11 stores information indicating the preset-setting-group icon newly displayed on the central area L1, into the RAM 43 as new information indicating the preset-setting-group icon being in the selected state, and the controller 11 displays this preset-setting-group icon in the selected state manner. Upon completion of S500, the flow returns to S448 in FIG. 4.

On the other hand, when it is determined at S488 that the user has not touched the left scroll button B71 or the right scroll button B72 (S488: NO), the flow goes to S508 in FIG. 7. At S508, the controller 11 determines whether a right or left drag operation has been input on the area 25B or not. Here is explained one example of how to determine whether the drag operation has been input or not. The controller 11 calculates the moving speed of the touch position using the same method as explained at S458. When the calculated moving speed of the touch position is less than the predefined first moving speed, the controller 11 determines that the drag operation has been input (S508: YES), and the flow goes to S509.

At S509, the controller 11 finishes the selected state manner of the preset-setting-group icon being in the selected state and displayed on the central area L1. At S510, the controller 11 scrolls the preset-setting-group icons displayed on the area 25B in the right or left direction according to a distance of the movement of the touch position. At S511, the controller 11 determines whether the touch panel portion 16C has ceased detecting the touch position or not. When it is determined that the touch panel portion 16C is detecting the touch position (S511: NO), the flow repeats S511. When it is determined that the touch panel portion 16C has ceased detecting the touch position (S511: YES), the flow goes to S512.

At S512, the controller 11 determines a preset-setting-group icon to be displayed, which is a preset-setting-group icon to be displayed newly on the central area L1. Here is explained one example of how to determine the preset-setting-group icon to be displayed. The controller 11 extracts preset-setting-group icons whose center lines have not moved past the center line of the central area L1 in the scroll direction, among the preset-setting-group icons B41-B47 moved in the scroll processing at S510. The controller 11 then determines, as the preset-setting-group icon to be displayed, a preset-setting-group icon that is located nearest to the central area L1 among the extracted preset-setting-group icons.

Processings at S514-S520 are respectively similar to the above-described processings at S474-S480, and an explanation of which is dispensed with.

On the other hand, when it is determined at S508 that the right or left drag operation has not been input on the area 25B (S508: NO), the flow goes to S528. At S528, the controller 11 determines whether the "Copy Start" button B61 has been touched or not. When it is determined that the "Copy Start" button B61 has been touched (S528: YES), the flow goes to S530. At S530, the controller 11 reads set values corresponding to the preset-setting-group icon being in the selected state and displayed on the central area L1, from the NVRAM 44 and stores the set values into the RAM 43. At S532, the controller 11 controls the image forming unit 13 to execute a copying processing according to the set values stored in the RAM 43.

On the other hand, when it is determined at S528 that the "Copy Start" button B61 has not been touched (S528: NO), the flow goes to S538 in FIG. 8. At S538, the controller 11 determines whether the "Detailed Settings" button B63 has been touched or not. When it is determined that the "Detailed Settings" button B63 has been touched (S538: YES), the flow goes to S540.

At S540, the controller 11 reads the setting items and their respective set values corresponding to the preset-setting-group icon being in the selected state and displayed on the central area L1, from the NVRAM 44 and stores them into the RAM 43. At S544, the controller 11 finishes the selected state manner of the preset-setting-group icon being in the selected state and displayed on the central area L1. At S546, the controller 11 removes the preset-setting-group icons displayed on the left neighborhood L2 and the right neighborhood L3. At S548, the controller 11 moves the preset-setting-group icon being in the selected state and displayed on the central area L1, to a retracted position L4 located at a right portion of the liquid crystal display 16A. The retracted position L4 as one example of a third area is a position located near an outer periphery of the display screen of the liquid crystal display 16A.

At S550, the controller 11 displays, as a specific image, a list of the setting items and their respective set values read at S540, on an area created by the movement of the preset-setting-group icon at S548. At S552, the controller 11 determines whether or not the user has performed a changing operation for changing the setting item. One example of the changing operation for changing the setting item includes an operation of the user to touch or drag any of the displayed setting items to change a corresponding set value. When it is determined that the user has not performed a changing operation for changing the setting item (S552: NO), the flow returns to S412 in FIG. 3. When it is determined that the user has performed a changing operation for changing the setting item (S552: YES), the flow goes to S554. At S554, the controller 11 determines whether the "OK" button B65 shown in FIG. 12 has been touched or not. When it is determined that the "OK" button B65 has not been touched (S554: NO), the flow returns to S552. When it is determined that the "OK" button B65 has been touched (S554: YES), the flow goes to S556. At S556, the controller 11 controls the image forming unit 13 to execute the copying processing according to the set values changed at S552.

Here is explained one example of the processings at S540-S556 with reference to FIGS. 10 and 12. In this explanation, it is assumed that the "Detailed Settings" button B63 has been touched on the screen shown in FIG. 10. The controller 11 at S540 reads the setting items and their respective set values corresponding to the preset-setting-group icon B44 ("Normal Copy") being in the selected state and displayed on the central area L1, from the NVRAM 44 and stores them into the RAM 43. The controller 11 at S544 finishes the selected state manner of the preset-setting-group icon B44 being in the selected state and displayed on the central area L1. The controller 11 at S546 removes the preset-setting-group icons B43 and B45 displayed on the left neighborhood L2 and the right neighborhood L3. The controller 11 at S548 moves the preset-setting-group icon B44 being in the selected state and displayed on the central area L1, to the retracted position L4 located on the right portion of the liquid crystal display 16A in FIG. 12. The controller 11 at S550 displays a list of the setting items and their respective set values relating to the "Normal Copy", on the area 27A created by the movement of the preset-setting-group icon B44. The controller 11 at S552 determines whether the changing operation has been performed on any of the setting items displayed on the area 27A. When the "OK" button B65 is touched (S554: YES), the controller 11 at S556 executes the copying processing according to the changed set values.

<Effects>

In the MFP 1 as explained above, the preset-setting-group icon being in the selected state is displayed on the central area L1 in the selected state manner (e.g., at S430, S432, S456, S480, S500, and S520), allowing the user to recognize the preset-setting-group icon currently selected. Also, when one preset-setting-group icon is displayed on the central area L1, and the user selects any of the other preset-setting-group icons, the controller 11 moves the selected preset-setting-group icon to the central area L1 (e.g., at S454, S468, S470, S494, S496, and S510) and stores information indicating the selected preset-setting-group icon, e.g., an icon ID, into the RAM 43 as new information indicating the preset-setting-group icon being in the selected state, and the controller 11 displays the preset-setting-group icon in the selected state manner (e.g., at S456, S480, S500, and S520). Thus, the area (i.e., the area 25B in FIG. 10 in the above-described embodiment) for receiving the operation of the user to select any of the preset-setting-group icon being in the selected state and the preset-setting-group icons being in the non-selected state can be used to have the user recognize the preset-setting-group icon being in the selected state. This results in effective use of the display screen when compared to a design in which the information indicating that the preset-setting-group icon is in the selected state is separately displayed on another area.

In the above-described MFP 1, the preset-setting-group icon being in the selected state is displayed such that its background color is changed to the specific color (i.e., blue) at S430 and the icon name is attached to the preset-setting-group icon at S432. This makes it easier for the user to recognize the preset-setting-group icon being in the selected state.

In the above-described MFP 1, the controller 11 moves each of the preset-setting-group icons displayed on the area 25B in a row, so that any of the preset-setting-group icons is positioned to the central area L1. As a result, the user only needs to find the preset-setting-group icon the user wants to move to the central area L1, from among the preset-setting-group icons arranged in a row, allowing the user to select the preset-setting-group icon with a simple operation.

In the above-described MFP 1, the preset-setting-group icons being in the non-selected state are displayed on the opposite sides of the central area L1, i.e., the left neighborhood L2 and the right neighborhood L3. As a result, the user only needs to find the preset-setting-group icon the user wants to move to the central area L1, from among the preset-setting-group icons displayed on the left neighborhood L2 and the right neighborhood L3, allowing the user to select the preset-setting-group icon with a simple operation.

In the above-described MFP 1, all the preset-setting-group icons being moved are displayed in the non-selected state manner (e.g., at S450, S460, S490, and S509) during the scroll display processing for moving the preset-setting-group icons. This configuration results in reduction in a load placed on the controller 11 during the image processing for moving the preset-setting-group icons.

In the above-described MFP 1, the preset-setting-group icon being in the selected state is moved from the central area L1 to the retracted position L4 at S548 in FIG. 12 in response to the touch on the "Detailed Settings" button B63 shown in FIGS. 10 and 11. This makes it possible to form the space on the central portion of the display screen for displaying the list of the setting items and the set values.

In the above-described MFP 1, one of only the preset-setting-group icons each allowed to be changed to the selected state in the detected apparatus state of the MFP 1 can be changed to the selected state (e.g., at S474 and S514). This prevents the user from selecting the preset-setting-group icon associated with an unusable function.

In the above-described MFP 1, when the preset-setting-group icons are scrolled in the one direction, the controller 11 prevents the preset-setting-group icons having moved past the central area L1 in the one direction from being displayed on the central area L1 (e.g., at S472 and S512). This operation does not cause a scroll in which the preset-setting-group icon having moved past the central area L1 moves in a direction opposite the one direction so as to be returned to the central area L1, whereby the controller 11 can display the scroll naturally.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

<Modifications>

The sensors for detecting the apparatus state of the MFP 1 are not limited to the sheet-size detection sensor 13A and the ink amount sensor 13B, and various types of sensors may be used. For example, sensors for detecting a paper jam and an open state of a cover may be used.

For example, in the above-described embodiment, the "Copy Start" button B61, the "Detailed Settings" button B63, the "OK" button B65, the left scroll button B71, and the right scroll button B72 are displayed on the liquid crystal display 16A, and the input operations thereon are received by the touch panel portion 16C. Nevertheless, some or all of the buttons may be constituted by an input device that differs from the touch panel portion 16C (e.g., an input device with hard buttons).

In the above-described embodiment, as one example of the display of the three preset-setting-group icons on the area 25B, the preset-setting-group icon being in the selected state is displayed on the central area L1, and the preset-setting-group icons being in the non-selected state are displayed on the right neighborhood L3 and the left neighborhood L2 such that these three icons are arranged in a row in a horizontal direction. Nevertheless, a different configuration may be employed as long as the preset-setting-group icon being in the non-selected state is displayed on an area that differs from an area on which the preset-setting-group icon being in the selected state is displayed. For example, the display screen may be designed such that the preset-setting-group icons are arranged in a row in a vertical direction, and the preset-setting-group icon being in the selected state is displayed on a central area while the preset-setting-group icons being in the non-selected state are displayed on an upper neighborhood and a lower neighborhood. Also, the preset-setting-group icons may be displayed so as to be arranged in a row along a curve (e.g., a circle or an arc).

While three preset-setting-group icons are displayed on the area 25B in the above-described embodiment, the number of preset-setting-group icons displayed on the area 25B is not limited to three and may be any number as long as the number is greater than two. In a case where the number of preset-setting-group icons displayed on the area 25B is five and these five preset-setting-group icons are arranged in a row, the preset-setting-group icon being in the selected state is displayed on a central portion of the area 25B, and the other four preset-setting-group icons being in the non-selected state are displayed on the area 25B other than its central portion, for example. In a case where the number of preset-setting-group icons displayed on the area 25B is four and these four preset-setting-group icons are arranged in a row, the preset-setting-group icon being in the selected state is displayed on the area 25B other than its end portions, and the other three preset-setting-group icons being in the non-selected state are displayed on portions of the area 25B which include its end portions and which differs from its portion on which the preset-setting-group icon being in the selected state is displayed, for example. In the case where the display screen is designed in such a manner, the four preset-setting-group icons can be arranged in a row in the order of the icon in the non-selected state, the icon in the selected state, the icon in the non-selected state, and the icon in the non-selected state or alternatively in the order of the icon in the non-selected state, the icon in the non-selected state, the icon in the selected state, and the icon in the non-selected state.

While the touch panel portion 16C is of the well-known type such as an electrostatic capacitance type in the above-described embodiment, the touch panel portion 16C may be of an electromagnetic induction type, an infrared type, a surface acoustic wave (SAW) type, or a resistive film type, for example.

While the liquid crystal display 16A and the internally illuminated display 16B share the single touch panel portion 16C in the above-described embodiment, different touch panel portions may be separately provided for the liquid crystal display 16A and the internally illuminated display 16B. In this design, these separate touch panel portions may be of the same type or different types. For example, this MFP 1 may be configured such that one of the touch panel portions is of a type suitable for an operation with a finger, and the other of the touch panel portions is of a type suitable for an operation with a passive object such as the stylus. Also, this MFP 1 may be configured such that one of the touch panel portions is of a type with a high resolution, and the other of the touch panel portions is of a type with a low resolution and a low cost.

In the above-described embodiment, the liquid crystal display 16A as a display device the touch panel portion 16C as an input device are overlaid with each other to constitute the operation panel unit 16 having a display function and an input function. Nevertheless, a single device having the display function and the input function may be employed for the operation panel 16.

In the above-described embodiment, the controller 11 and the operation panel 16 of the MFP 1 are configured to perform the various displays and receive the various inputs. Nevertheless, in a case where the MFP 1 and an information processing device such as a personal computer (PC) and a smartphone are coupled to each other, a controller, a display portion, and an input portion of the information processing device can be used to perform the various displays and receive the various inputs.

Specifically, a program is installed on the information processing device for causing the controller of the information processing device coupled to the MFP 1 to execute the same processings as indicated in the flow charts shown in FIGS. 3-8, and the controller of the information processing device executes a processing according to the program. As a result, the display portion and the input portion of the information processing device perform the various displays and receive the various inputs, for example, each of the screens shown in FIGS. 9-12 is displayed on the display portion of the information processing device.

It should be understood that while there has been explained the changes of the settings for the copying function in the above-described embodiment, changes of the settings for another function can also be performed using a user interface that is similar to that used in the above-described embodiment.

While there has been explained the MFP 1 having the facsimile function, the scanning function, the copying function, and so on in the above-described embodiment, the present invention is applicable to a printer, an image scanner, a facsimile machine, and other devices each having a single function. Also in a case where the information processing device such as the personal computer (PC) and the smartphone are used as the display portion and the input portion, the information processing device can control such single-function devices. In this case, the information processing device utilizes the program to execute the same processings as indicated in the flow charts shown in FIGS. 3-8 to perform the displays and inputs for the single-function devices.

What is claimed is:
1. An image processing apparatus, comprising:
an image processing device comprising at least one of: an image reading device configured to read an image from a document; and an image forming device configured to form an image on a recording medium;

a display portion configured to display thereon at least one image and detect that a display screen of the display portion is touched by an input object;

a preset-setting-group storage device configured to store a plurality of preset-setting groups each constituted by a set of a plurality of settings relating to an image processing to be executed by the image processing device, the set of the plurality of settings being combined together in advance;

a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, when at least two icons of the plurality of icons are displayed on the display portion such that one icon of the at least two icons is displayed in the selected state manner, and a specific icon of the at least two icons which is different from the one icon is displayed in the non-selected state manner, and when the display portion outputs a signal corresponding to a touch of the input object on a position corresponding to the specific icon within the display portion, the preset-setting-group-selection-screen display controller moves the specific icon located on the second area to the first area and moves the one icon located on the first area to the second area in a direction in which the specific icon is moved, and the preset-setting-group-selection-screen display controller controls the display portion to display the specific icon having been moved to the first area in the selected state manner as a new icon and display the one icon having been moved to the second area in the non-selected state manner.

2. The image processing apparatus according to claim 1, wherein the icon displayed in the selected state manner is displayed with a particular image indicating that the icon displayed in the selected state manner is in the selected state.

3. The image processing apparatus according to claim 1, wherein the new icon displayed on the first area and the at least one icon displayed on the second area are arranged in a row.

4. The image processing apparatus according to claim 1, wherein the display portion is configured to display at least three icons of the plurality of icons such that the at least three icons are arranged in a row in a predefined order, and wherein the preset-setting-group-selection-screen display controller is configured to control the display portion to display:

a first icon of the at least three icons on the first area in the selected state manner;

a second icon of the at least three icons on one part of the second area in the non-selected state manner, the second icon being different from the first icon displayed on the first area, the second icon preceding the one icon in the predefined order, the one part of the second area being adjacent to the first area on one of opposite sides of the first area in a first direction;

a third icon of the at least three icons on another part of the second area in the non-selected state manner, the third icon being different from the first icon displayed on the first area, the third icon following the one icon in the predefined order, said another part of the second area being adjacent to the first area on the other of the opposite sides of the first area in the first direction.

5. The image processing apparatus according to claim 1, wherein the preset-setting-group-selection-screen display controller is configured to display, during the movement of the icons, all the icons being moved, in the non-selected state manner and display the new icon in the selected state manner after an end of the movement of the icons.

6. The image processing apparatus according to claim 1, wherein, in response to receipt of a command for displaying a specific image indicative of specific information, the preset-setting-group-selection-screen display controller moves the one icon located on the first area to a third area within the display screen and displays the specific image on an area containing the first area, and wherein a distance between the third area and a periphery of the display screen is less than a distance between the first area and the periphery of the display screen.

7. The image processing apparatus according to claim 1, further comprising an apparatus-state detector configured to detect a state of the image processing apparatus as an apparatus state, wherein the preset-setting-group-selection-screen display controller is configured to determine the new icon among at least one icon that is allowed to be determined as the new icon based on the apparatus state detected by the apparatus-state detector.

8. The image processing apparatus according to claim 7, wherein the display screen has a two-icon display area that is an area where the at least two icons are displayed, and wherein, when the display portion outputs a signal corresponding to a movement of a touch position of the input object on the two-icon display area in one direction in the state in which the at least two icons are displayed on the two-icon display area, the preset-setting-group-selection-screen display controller scrolls the at least two icons in the one direction on the basis of the movement of the touch position, and, when the display ceases detecting the touch position, the preset-setting-group-selection-screen display controller determines, as the new icon, an icon having been displayed nearest to the first area among the at least one icon that is allowed to be determined as the new icon.

9. The image processing apparatus according to claim 8, wherein the display portion is configured to display the plurality of icons in a predefined order, wherein the preset-setting-group-selection-screen display controller is configured to determine whether the icon to be displayed nearest to the first area is allowed to be displayed in the selected state manner, based on the apparatus state detected by the apparatus-state detector, wherein, when the preset-setting-group-selection-screen display controller determines that the icon to be displayed nearest to the first area is allowed to be displayed in the selected state manner, the preset-setting-group-selection-screen display controller determines the icon to be displayed nearest to the first area as the new icon, and wherein, when the preset-setting-group-selection-screen display controller determines that the icon to be displayed nearest to the first area is not allowed to be displayed in the selected state manner, the preset-setting-group-selection-screen display controller determines whether an icon following the icon to be displayed nearest to the first area in the predefined order is allowed to be displayed in the selected state manner.

10. An image processing apparatus, comprising:
an image processing device comprising at least one of: an image reading device configured to read an image from a document; and an image forming device configured to form an image on a recording medium;
a display portion configured to display thereon at least one image and detect that a display screen of the display portion is touched by an input object;
a preset-setting-group storage device configured to store a plurality of preset-setting groups each constituted by a set of a plurality of settings relating to an image processing to be executed by the image processing device, the set of the plurality of settings being combined together in advance;
a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and
an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner,
wherein, in a state in which at least two icons of the plurality of icons are displayed on the display portion, the display screen has a two-icon display area that is an area where the at least two icons are displayed, and when the display portion outputs a signal corresponding to a movement of a touch position of the input object on the two-icon display area in one direction, the preset-setting-group-selection-screen display controller scrolls the at least two icons in the one direction on the basis of the movement of the touch position, and, when the display portion ceases detecting the touch position, the preset-setting-group-selection-screen display controller controls the display portion to display (i) one of the at least two icons which is to be displayed nearest to the first area, on the first area as the new icon in the selected state manner and (ii) at least one icon of the at least two icons other than the new icon in the non-selected state manner.

11. The image processing apparatus according to claim 10, wherein the first area has a first reference position as a display position on the display screen,
wherein each of the plurality of icons has a second reference position as a display position on the display screen, and
wherein, when the display portion ceases detecting the touch position, the preset-setting-group-selection-screen display controller determines, as the new icon, an icon having the second reference position that is located nearest to the first reference position among at least one icon of the plurality of icons, whose the second reference position has not moved past the first reference position in the one direction.

12. A non-transitory storage medium storing a program to be executed by a computer of an image processing apparatus comprising an image processing device comprising at least one of: an image reading device configured to read an image from a document; and an image forming device configured to form an image on a recording medium, the program being designed to cause the computer to function as:
a display portion configured to display thereon at least one image and detect that a display screen of the display portion is touched by an input object;
a preset-setting-group storage device configured to store a plurality of preset-setting groups each constituted by a set of a plurality of settings relating to an image processing to be executed by the image processing device, the set of the plurality of settings being combined together in advance;
a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and
an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner,
wherein, when at least two icons of the plurality of icons are displayed on the display portion such that one icon of the at least two icons is displayed in the selected state manner, and a specific icon of the at least two icons which is different from the one icon is displayed in the non-selected state manner, and when the display portion outputs a signal corresponding to a touch of the input object on a position corresponding to the specific icon within the display portion, the preset-setting-group-selection-screen display controller moves the specific icon located on the second area to the first area and moves the one icon located on the first area to the second area in a direction in which the specific icon is moved, and the preset-setting-group-selection-screen display controller controls the display portion to display the specific icon having been moved to the first area in the selected state manner as a new icon and display the one icon having been moved to the second area in the non-selected state manner.

13. A non-transitory storage medium storing a program to be executed by a computer of an image processing apparatus comprising an image processing device comprising at least one of: an image reading device configured to read an image from a document; and an image forming device configured to form an image on a recording medium, the program being designed to cause the computer to function as:
- a display portion configured to display thereon at least one image and detect that a display screen of the display portion is touched by an input object;
- a preset-setting-group storage device configured to store a plurality of preset-setting groups each constituted by a set of a plurality of settings relating to an image processing to be executed by the image processing device, the set of the plurality of settings being combined together in advance;
- a preset-setting-group-selection-screen display controller configured to control the display portion to display a plurality of icons respectively corresponding to the plurality of preset-setting groups, such that one icon of the plurality of icons is displayed in a selected state manner that indicates a selected state, and at least one icon of the plurality of icons other than the one icon is displayed in a non-selected state manner that indicates a non-selected state and differs from the selected state manner, and such that the one icon is displayed on a first area within the display screen, and the at least one icon is displayed on a second area within the display screen, the second area being located at a position different from that of the first area; and
- an image-processing-device controller configured, upon receiving a user operation on a start button in a state in which the at least one icon is displayed on the display portion by the preset-setting-group-selection-screen display controller, to control the image processing device to execute the image processing according to the set of the plurality of settings of one of the plurality of preset-setting groups which corresponds to the one icon being displayed in the selected state manner, wherein, in a state in which at least two icons of the plurality of icons are displayed on the display portion, the display screen has a two-icon display area that is an area where the at least two icons are displayed, and when the display portion outputs a signal corresponding to a movement of a touch position of the input object on the two-icon display area in one direction, the preset-setting-group-selection-screen display controller scrolls the at least two icons in the one direction on the basis of the movement of the touch position, and, when the display portion ceases detecting the touch position, the preset-setting-group-selection-screen display controller controls the display portion to display (i) one of the at least two icons which is to be displayed nearest to the first area, on the first area as the new icon in the selected state manner and (ii) at least one icon of the at least two icons other than the new icon in the non-selected state manner.

* * * * *